3,013,021
α-KETO-β-CYCLOALKANOYL-γ-LACTONES
AND THEIR PREPARATION
William Taub, % The Weizmann Institute of Science,
Rehovoth, Israel
No Drawing. Filed Jan. 22, 1959, Ser. No. 788,278
11 Claims. (Cl. 260—343.6)

This invention consists in new α-keto-β-cycloalkanoyl-γ-halogenomethyl-γ-lactone compounds of the general formula

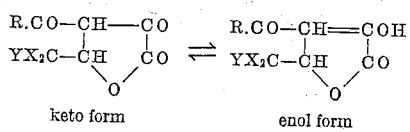

keto form      enol form wherein R stands for an alicyclic radical having from 3 to 8 nuclear carbon atoms which may have one or more lower alkyl groups as substituents, and may have one unsaturated double bond in the nucleus, X stands for chlorine or bromine, and Y stands for hydrogen, chlorine or bromine.

These new compounds have been found to possess therapeutically valuable physiological properties, in particular an antiphlogistic effect, by which they are distinguished from other α-keto-γ-lactones of even similar structure.

In the enol form the new compounds are pronouncedly acidic and can form salts with inorganic or organic bases as well as esters and ethers.

The new compounds according to the invention may be prepared by the condensation of cycloalkanoyl-pyruvic acid esters with dichloro, trichloro, dibromo or tribromo acetaldehyde at temperatures not exceeding room temperature, and preferably between 0° and 10° C.

Outstanding among the new compounds for its favourable therapeutic effect and satisfactory therapeutic index is α-keto-β-cyclopropanoyl-γ-trichloromethyl-γ-lactone.

The invention is illustrated by the following examples:

Example 1

46.0 g. (0.25 mole) of ethyl β-cyclopropanol pyruvate are dissolved in 150 cc. of dry benzene. To this solution 15 g. of high-grade commercial sodium methoxide are added in small portions with effective stirring while the temperature is kept below 5° C. by applying external cooling. 30 g. of freshly distilled dichloro-acetaldehyde are now added dropwise with stirring while the temperature of the reaction mixture is maintained at 0°. The slightly coloured solution is left for a few hours at room temperature and is then poured into 400 cc. of ice water with vigorous stirring. The aqueous layer containing the Na enolate of the α-keto-γ-lactone derivative formed during the reaction is filtered and added from a dropping funnel to a mixture of 40 cc. of concentrated HCl and 150 g. of crushed ice with effective stirring. The oily precipitate solidifies quite rapidly. After recrystallization from methylcyclohexane the pure α-keto-β-cyclopropanoyl γ-dichloromethyl-γ-lactone thus obtained melts at 175° C.

Example 2

To a solution of 18.4 g. (0.1 mole) of ethyl β-cyclopropanoyl pyruvate in 100 cc. of dry toluene 6 g. of commerical sodium methoxide are added with stirring while the temperature of the mixture is kept below 0°. 28 g. of tribromo-acetaldehyde are now added in small portions while the temperature of the mixture is not allowed to exceed 5° C. After being left for some hours at room temperature the yellowish solution is extracted by shaking with 200 cc. of ice water. The filtered aqueous solution is acidified with ice-cold 10% sulphuric acid. A brownish oily precipitate is formed which solidifies after some standing. After being recrystallized twice from a mixture of benezene-methyl-cyclohexane the pure α-keto-β-cyclopropanoyl-γ-tribromomethyl-γ-lactone thus obtained melts at 145–46° C.

1 g. of this product dissolved in 10 cc. of absolute ether and treated with a small excess of ethereal diazomethane solution yields the methyl ether of its enol form which can be recrystallized from petroleum ether.

Example 3

To 92 g. (0.5 mole) of ethyl β-cyclopropanoyl pyruvate dissolved in 350 cc. of dry toluene 12 g. of sodium hydride are added in small portions with effective stirring. The temperature of the solution is kept at 10–20° C. during this time by external cooling. When no more unreacted sodium hydride is present and the evolution of hydrogen has ceased, 75 g. of freshly distilled trichloro-acetaldehyde (chloral) are added dropwise with effective stirring in the course of 40 minutes during which the temperature is maintained at 0–5° C. After one hour of additional stirring the slightly brownish solution is poured with vigorous stirring into 1000 cc. of ice-water. The strongly alkaline aqueous layer contains the desired reaction product in the form of its sodium enolate, it is filtered and added from a dropping funnel to a mixture of 70 cc. of concentrated hydrochloric acid (d=1.18) and 250 cc. of ice-water. Effective stirring is to be applied during this time. The crude reaction product precipitates in the form of a viscous yellowish oil which solidifies on standing. By recrystallization from aqueous methanol and then from cyclohexane 97 g. of a product melting at 111–113° C. are obtained, being pure α-keto-β-cyclopropanoyl-γ-trichloromethyl-γ-lactone.

2.85 g. (0.01 mole) of this product are mixed with 5 cc. of pyridine and admixed with 0.8 g. of acetyl chloride. After standing for 12 hours at room temperature the mixture is poured into ice-cold diluted hydrochloric acid. The aqueous layer is extracted with ether. After evaporation of the solvent the enol acetate of α-keto-β-cyclopropanoyl-γ-trichloromethyl-γ-lactone is obtained. It can be purified by recrystallization from a mixture of benzene-cyclohexane.

As the enol form of α-keto-β-cyclopropanoyl-γ-trichloromethyl-γ-lactone is strongly acidic, it readily forms water-soluble salts with inorganic and organic bases. For example, 2.85 g. of the lactone aforesaid dissolve readily in 10 cc. of 0.1 N NaOH. The solid alkali salts are strongly hygroscopic and not very stable.

Example 4

To a solution of 39.6 g. (0.2 mole) ethyl β-methylcyclopropanoyl pyruvate (obtained by condensing acetylmethylcyclopropane with diethyl oxalate in the presence of sodium methoxide) in 400 cc. of dry toluene 4.9 g. of commercial sodium hydride are added in small portions with stirring while the temperature of the mixture is kept below 10° C. When no more hydrogen is evolved, 30 g. of freshly distilled anhydrous chloral are added dropwise while the temperature is maintained between 0–10° C. After some additional stirring the solution is extracted by vigorous shaking with 500 cc. of ice-water. The aqueous layer containing the desired reaction product is filtered and the filtrate poured into an excess of cold diluted hydrochloric acid. A yellowish oily product precipitates immediately. It solidifies slowly after being repeatedly washed with ice-water. After several fractionated crystallizations from mixtures of toluene-methylcyclohexane both the cis- and trans- forms of α-keto-β-methylcyclopropanoyl-γ-trichloromethyl-γ-lactone are obtained, melting at 110° C. and 167–69° C., respectively.

Example 5

21.2 g. (0.1 mole) of ethyl β-(2,2-dimethylcyclopropanoyl)-pyruvate (obtained by condensing acetyl-(2,2-dimethylcyclopropane) with diethyl oxalate in the presence of sodium methoxide) dissolved in 300 cc. of dry benzene are admixed with 2.5 g. of sodium hydride in small portions. When no more unreacted sodium hydride is present and the evolution of hydrogen has ceased, 15 g. of freshly distilled anhydrous chloral are added with stirring while the temperature of the reaction mixture is maintained below 10° C. By working up the reaction mixture in the usual manner, crude α-keto-β-(2,2-dimethylcyclopropanoyl)-γ-trichloromethyl-γ-lactone is obtained. It is purified by recrystallization from methylcyclohexane.

Example 6

21.2 g. (0.1 mole) of ethyl β-cyclopentanoyl pyruvate and 30 g. of freshly distilled trichloro-acetaldehyde are heated in a sealed tube at 150–160° C. for 4 hours. After the removal of the unreacted components in vacuo the oily residue solidifies slowly. After two recrystallizations from a mixture of toluene-petroleum ether, pure α-keto-β-cyclopentanoyl-γ-trichloromethyl-γ-lactone of M.P. 136–137° C. is obtained.

Example 7

To 2.3 g. of micronized sodium metal suspended in 150 cc. of dry toluene, 5.0 cc. of absolute ethanol are added dropwise, if necessary with gentle heating until the metal has entirely dissolved. 22.6 g. (0.1 mole) of ethyl β-cyclohexanoyl pyruvate are now added with stirring while the temperature is kept between 0–10° C. After some additional stirring 15 g. of freshly distilled dichloroacetaldehyde are slowly added from a dropping funnel while the temperature of the reaction mixture must not exceed 5° C. The slightly coloured solution is left for a few hours at room temperature and is then extracted by vigorous shaking with 250 cc. of ice-water. The aqueous layer is filtered and acidified by cold dilute mineral acid. The crude reaction product precipitates and is filtered off. After recrystallization from methanol white crystals of α-keto-β-cyclohexanoyl-γ-dichloromethyl-γ-lactone are obtained, which melts at 160–161° C.

Example 8

A solution of 63 g. (0.5 mole) of acetyl-cyclohexane, 73 g. of freshly distilled diethyl oxalate and 400 cc. of dry toluene is admixed with 30 g. of high-grade commercial sodium methoxide with vigorous stirring. Condensation takes place and the temperature of the reaction mixture may reach 60–70° C. After cooling down the reaction product solidifies, forming a cake of the sodium enolate of ethyl β-cyclohexanoyl pyruvate. A suspension of this crude Na-enolate in additional 300 cc. of dry toluene is cooled externally to 0° and admixed under vigorous stirring with 75 g. of freshly distilled anhydrous chloral. This requires approximately 45 minutes during which the temperature must never exceed 10°. After standing for some hours the liquid reaction product is extracted by shaking with 750 cc. of cold water. The filtered aqueous layer is acidified by adding dilute mineral acid. An oily precipitate is formed which slowly solidifies on standing. After several recrystallizations from methylcyclohexane and from toluene-petroleum ether, white crystals of α-keto-β-cyclohexanoyl-γ-trichloromethyl-γ-lactone of M.P. 185–186° C. are obtained.

Example 9

To 22.2 g. (0.1 mole) of ethyl β-cyclohexen-4-oyl-pyruvate (obtained by condensing acetyl-cyclohex-4-ene with diethyl oxalate in the presence of Na methoxide) dissolved in 250 cc. of dry benzene, 6 g. of commercial Na methoxide are slowly added with stirring, the temperature being kept at 0°. To the solution of the Na enolate thus obtained, 15 g. of chloral are added with stirring; during the addition the temperature must not exceed 5° C. By working up the reaction mixture in the usual manner the crude reaction product is obtained. It is recrystallized from methanol and again from methylcyclohexane, yielding white crystals of α-keto-β-(cyclohexen-4-oyl)-γ-trichloromethyl-γ-lactone melting at 167–168° C.

Example 10

To a solution of 70.8 g. (0.3 mole) of ethyl β-(bicyclo-2,2,1-hepten-3-oyl)-pyruvate of the formula

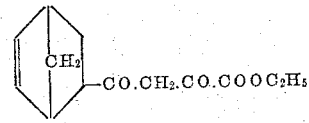

in 750 cc. of dry benzene, 15 g. of commercial sodium methoxide are added with stirring in small portions, the temperature being kept below 5° C. To this solution of the Na-enolate of the ester, 42 g. of anhydrous pure chloral are slowly added from a dropping funnel with effective stirring. External cooling by means of ice-salt mixture is applied during this time in order to maintain the temperature of the solution at 0°. After extracting the benzene solution with 1000 cc. of cold water the aqueous layer is filtered and the filtrate acidified with dilute hydrochloric acid. The crude oily reaction product is extracted with ether. After evaporation of the solvent the crude α-keto-γ-lactone derivative solidifies on standing. Several recrystallizations from methyl alcohol and then from methylcyclohexane yield a white crystalline powder consisting of pure α-keto-β-(bicyclo-2,2,1-hepten-3-oyl)-γ-trichloromethyl-γ-lactone melting at 155–156° C.

The designation of the keto form of the compounds of this invention, wherever the context so requires or admits, is understood as including the enol form.

I claim:

1. Compounds having the following formula,

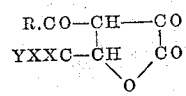

wherein R is an unsubstituted alicyclic radical having from 3 to 8 nuclear carbon atoms, X is a member selected from the group consisting of chlorine and bromine and Y is a member selected from the group consisting of H, chlorine and bromine.

2. α - Keto - β - cyclopropanoyl-γ-dichloromethyl-γ-butyrolactone.

3. α - Keto - β - (cyclohexen-4-oyl)-γ-trichloromethyl-γ-butyrolactone.

4. α - Keto - β - (bicyclo-[2,2,1$^{1,4}$]-5-hepten-3-oyl)-γ-trichloromethyl-γ-butyrolactone.

5. α - Keto - β - methylcyclopropanoyl-γ-trichloromethyl-γ-butyrolactone (cis and trans).

6. α - Keto - β -(2,2-dimethylcyclopropanoyl)-γ-trichloromethyl-γ-butyrolactone.

7. α - Keto - β - cyclopentanoyl-γ-trichloromethyl-γ-butyrolactone.

8. α - Keto - β - cyclohexanoyl - γ-dichloromethyl-γ-butyrolactone.

9. α - Keto - β - cyclohexanoyl - γ-trichloromethyl-γ-butyrolactone.

10. A process for preparing compounds having the following formula,

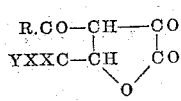

wherein R is an unsubstituted alicyclic radical having from 3 to 8 nuclear carbon atoms, X is a member selected from the group consisting of chlorine and bromine and Y is a member selected from the group consisting of H, chlorine and bromine which comprises reacting an ethyl ester of an acid having the formula, $$R.CO-CH_2-CO-COOH$$

with a substituted acetaldehyde of the formula, $$YXXC.CHO$$

at a temperature up to room temperature.

11. The process of claim 10, wherein the temperature of reaction is within the range from about 0° C. to about 10° C.

References Cited in the file of this patent
UNITED STATES PATENTS 2,435,018   Ruzicka _____ Jan. 27, 1958

OTHER REFERENCES

Henne et al.: Journ. Amer. Chem. Soc., vol. 58 (1936), page 882.

Simons et al.: "Fluorine Chemistry," Academic Press, New York (1950), page 402.

Rothstein: Bull. Soc. Chim. France, vol. 20, p. 401 (1953).

UNITED STATES PATENT OFFICE
CERTIFICATE OF CORRECTION

Patent No. 3,013,021                          December 12, 1961

William Taub

It is hereby certified that error appears in the above numbered patent requiring correction and that the said Letters Patent should read as corrected below.

Column 1, line 43, for "β-cyclopropanol" read -- β-cyclopropanoyl --; column 3, line 42, for "while" read -- white --.

Signed and sealed this 19th day of June 1962.

(SEAL)
Attest:

ERNEST W. SWIDER
Attesting Officer

DAVID L. LADD
Commissioner of Patents